(12) United States Patent
Reiter

(10) Patent No.: US 8,100,795 B2
(45) Date of Patent: Jan. 24, 2012

(54) RIVETED SPROCKET ASSEMBLY

(75) Inventor: Markus Reiter, Schweinfurt (DE)

(73) Assignee: SRAM Deutschland GmbH, Schweinfurt (DE)

(*) Notice: Subject to any disclaimer, the term of this patent is extended or adjusted under 35 U.S.C. 154(b) by 426 days.

(21) Appl. No.: 10/908,892

(22) Filed: May 31, 2005

(65) Prior Publication Data

US 2005/0272546 A1    Dec. 8, 2005

(30) Foreign Application Priority Data

Jun. 8, 2004 (DE) .......................... 10 2004 027 963

(51) Int. Cl.
*F16F 55/12* (2006.01)

(52) U.S. Cl. ........................................ 474/160; 474/164

(58) Field of Classification Search ................. 474/152, 474/158–160, 164; D12/123
See application file for complete search history.

(56) References Cited

U.S. PATENT DOCUMENTS

| 5,194,051 | A | * | 3/1993 | Nagano | 474/160 |
| 5,213,550 | A | * | 5/1993 | Wu | 474/160 |
| 5,314,366 | A | * | 5/1994 | Palm | 474/152 |
| 5,954,604 | A | * | 9/1999 | Nakamura | 474/160 |
| 6,024,662 | A | * | 2/2000 | Fujimoto | 474/144 |
| 6,102,821 | A | | 8/2000 | Nakamura | |
| 6,176,798 | B1 | * | 1/2001 | Nakamura | 474/160 |
| 6,382,381 | B1 | * | 5/2002 | Okajima et al. | 192/64 |
| 6,428,437 | B1 | * | 8/2002 | Schlanger | 474/160 |
| 7,131,656 | B2 | * | 11/2006 | Valle | 280/260 |
| 2003/0073531 | A1 | * | 4/2003 | Tseng | 474/160 |
| 2003/0153423 | A1 | * | 8/2003 | Smith | 474/160 |
| 2004/0121867 | A1 | * | 6/2004 | Reiter | 474/160 |
| 2005/0233850 | A1 | * | 10/2005 | Andel | 474/152 |

FOREIGN PATENT DOCUMENTS

| DE | 296 23 671 U1 | 3/1999 |
| DE | 199 37 212 A1 | 2/2001 |
| EP | 0 849 155 A2 | 6/1998 |
| EP | 1 074 462 B1 | 2/2001 |

* cited by examiner

*Primary Examiner* — Bradley King
*Assistant Examiner* — Thomas Irvin
(74) *Attorney, Agent, or Firm* — Milan Milosevic; Lisa Serdynski; Steven Courtright

(57) ABSTRACT

A riveted sprocket assembly that includes a sprocket carrier having a plurality of carrier arms and a plurality of sprockets attached to the carrier arms by rivets. First and second rivet heads of the rivets are countersunk into the carrier arms on one face and into the sprocket on the other face. The second rivet head is formed on the sprocket on the front face of the sprocket carrier. To prevent the riveting tool from damaging the sprocket during the riveting process, the rivet holes of the sprockets include a clearance portion around the second rivet head. This results in the sprocket having three-stepped rivet holes: a small diameter for the rivet shaft, an intermediate diameter for the rivet head and a larger diameter for the riveting tool. To minimize weight, the carrier arms narrow in a central region between radially inner and radially outer rivet holes on the carrier arms.

2 Claims, 5 Drawing Sheets

RIVETED SPROCKET ASSEMBLY

BACKGROUND OF THE INVENTION

The present invention relates to bicycle sprocket assemblies and more particular to a sprocket assembly including a lightweight sprocket carrier and a plurality of sprockets having stepped rivet holes configured to receive a rivet shaft, a rivet head and a riveting tool.

Typically, a sprocket assembly for a bicycle having a derailleur gear system includes multiple sprockets that are supported, concentrically with decreasing diameters, by a sprocket carrier. For example, DE 199 37 212 A1 discloses a sprocket assembly that includes a plurality of sprockets attached to a stepped four-arm sprocket carrier. The largest sprocket supports the sprocket carrier and each step receives a sprocket. The largest sprocket and sprocket carrier are non-rotatably mounted to the wheel hub for transferring the torque of the other sprockets to the wheel hub. The other sprockets are attached to the sprocket carrier or the largest sprocket by rivets.

Another sprocket assembly is disclosed in the Utility Model DE 296 23 671 U1 that includes two sprocket subassemblies. Each subassembly includes a hub and carrier arms extending radially outward from the hub. Two sprockets are attached to each subassembly, one on each face of the carrier arms, using the same rivets. A difference between a number of teeth on the two sprockets is small. Spacers are used to individually attached several other sprockets to the bicycle hub.

Due to the desire to have a large number of sprockets, resulting in close gear ratio spacing with small differences in sprocket outside diameters, and the desire to have a lightweight construction, several drawbacks are associated with the above sprocket assemblies. One drawback with tight axial arrangement of individual sprockets on the sprocket carrier is projecting rivet heads that protrude into the space between the sprockets and interfere with the chain. Another problem is the damage to the sprocket surface caused by the riveting tool during the riveting process. Therefore, there is a need for skillful arrangement and attachment of multiple sprockets on a sprocket carrier.

SUMMARY OF THE INVENTION

The present invention provides a riveted sprocket assembly for a bicycle that includes a sprocket carrier and a plurality of sprockets attached to the carrier by rivets. The rivets have a shaft and first and second rivet heads. The sprockets includes a plurality of rivet holes for receiving the rivets. The rivet holes include a shaft portion for receiving the shaft of the rivet, a countersink portion for receiving the second rivet head and a clearance portion for receiving a riveting tool. The shaft portion of the rivet hole has a first diameter that is equal to or greater than the diameter of the shaft of the rivet. The countersink portion of the rivet hole has a second diameter that is equal to or greater than the diameter of the rivet head. The second diameter is larger than the first diameter. The clearance portion of the rivet hole has a third diameter configured to provide clearance for the riveting tool. The third diameter is equal to or greater than the second diameter.

The sprocket carrier includes a hub and the plurality of carrier arms extending radially outward from the hub. The hub includes a plurality of splines having different widths engageable with corresponding splines on a wheel hub. A front face of the carrier arms includes steps for receiving the sprockets and a rear face of the carrier arms is substantially flat. The carrier arms also include rivet holes associated with each step for receiving the shafts of the rivets. To minimize the weight of the sprocket carrier, the wall thickness of the hub is minimized and the transition of the carrier arms to the hub is smooth. Further, the carrier arms narrow in circumferential width at a central region and become wider again toward the radial outward end of the carrier arm. Even though the carrier arms have a narrow central region, the strength or stability of the carrier is not affected because the steps increase the axial thickness of the carrier arms radially inward toward the hub. The axial thickness of an end region of the carrier arms is determined by the spacings of the outer sprockets.

The largest and second largest sprockets are attached laterally to the rear and front faces of the sprocket carrier, respectively, using a single rivet per carrier arm. The remaining sprockets are attached to the front face of the carrier arms. Because of the large number of sprockets that have to be attached to the carrier, the axial space of the sprockets and interstices between adjacent sprockets have to be minimized.

The sprockets are attached to the carrier by first inserting the shafts of the rivets into the rivet holes of the carrier arm from the rear face of the carrier. Then the end of the shaft extending from the sprocket and the front face of the carrier is riveted by the riveting tool to form the second rivet head. During the riveting operation, the rivet shaft expands in the rivet hole of the sprocket but also contacts a portion of the rivet hole in the carrier arm. This operation, ensures that the rivet is locked into place in the rivet hole on the sprocket and the carrier arm, resulting in an immovable zero-clearance attachment of the sprocket to the carrier arm.

In another embodiment of the present invention, a pin rivet having no rivet heads before installation may be used to attach the sprocket to the carrier rather than a rivet. First and second rivet heads are formed by riveting both ends of the pin rivet after the pin is inserted in the rivet holes of both the sprocket and the carrier arm. During the riveting operation, the rivet shaft becomes locked both in the rivet hole of the sprockets and in the respectively adjacent hole region of the rivet hole of the carrier arm.

It is an object of the present invention to provide a sprocket assembly that is lightweight but stiff in terms of torque, and optimized in terms of production and installation especially with regard to the riveting operation. These objects are achieved by a lightweight configuration of arms of the sprocket carrier and by the stepped configuration of the rivet holes on the sprocket for receiving the rivet heads.

It is an object of the present invention to avoid the projection of the rivet heads beyond the axial sprocket contour by countersinking the rivet heads and avoid damage to the sprocket surface by the riveting tool by providing a clearance that extends around the rivet head of the rivet.

With this riveted sprocket assembly and with further smaller sprockets that, because of their small tooth counts, are arranged not on but rather next to the sprocket carrier, it is possible to assemble a sprocket assembly that has a very small axial thickness and is lighter and more economical as compared with the approaches described in the aforesaid patent documents.

These and other features and advantages of the invention will be more fully understood from the following description of certain embodiments of the invention, taken together with the accompanying drawings.

DETAILED DESCRIPTION OF THE DRAWINGS

DETAILED DESCRIPTION

Figure 1:
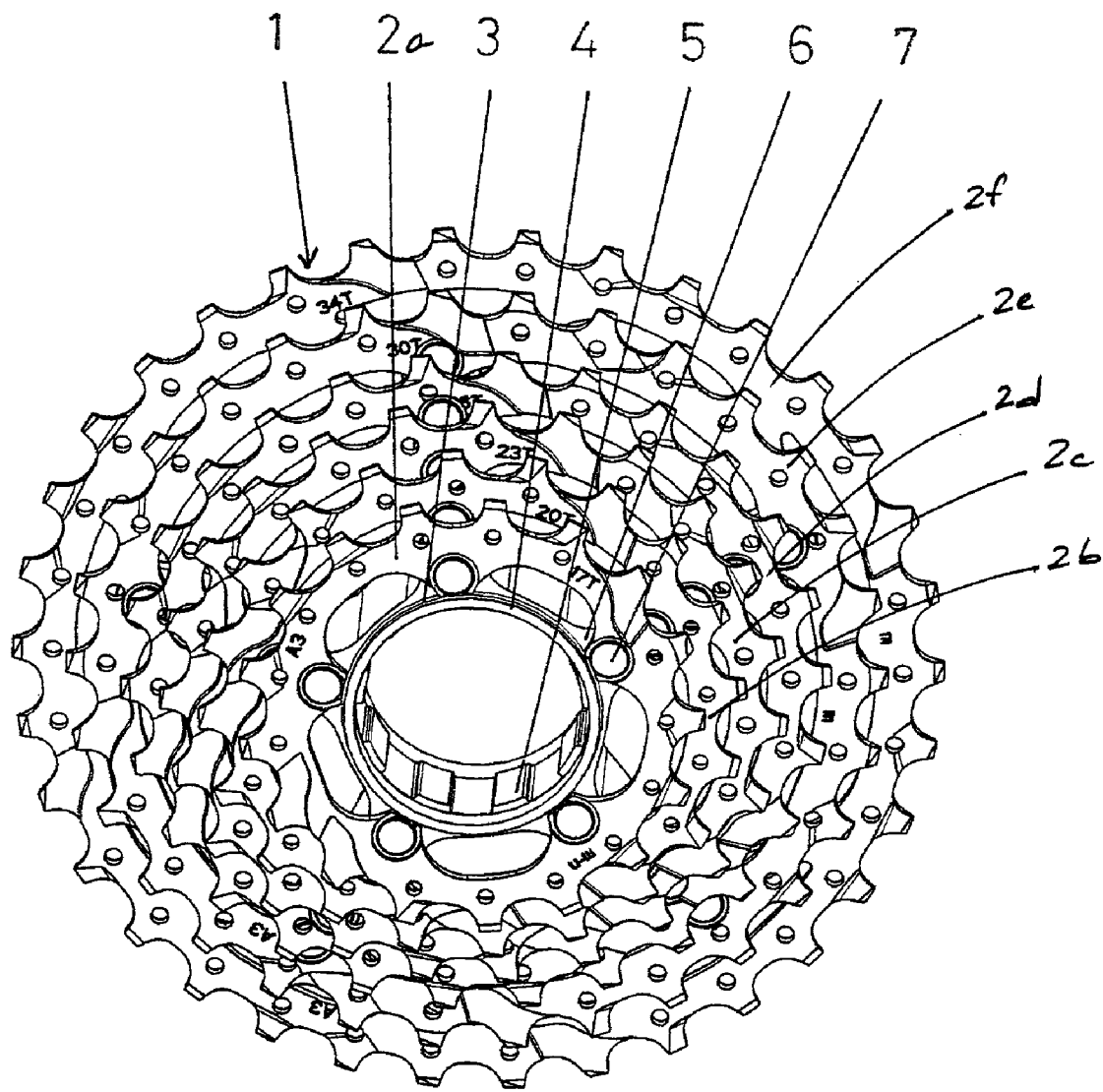
FIG. 1 is a perspective front view of a sprocket assembly in accordance with one embodiment of the present invention.

FIGS. 1-4 show a riveted sprocket assembly 1 in accordance with one embodiment of the present invention. The sprocket assembly 1 generally includes a plurality of sprockets 2a-2f, in this embodiment six sprockets, attached to a sprocket carrier 3 by rivets 7. The sprocket carrier 3 includes a hub 4 and a plurality of carrier arms 6 extending radially outward from the hub 4. The hub 4 includes inner splines 5 of various widths engageable with corresponding splines on a wheel hub (not shown) for positively transferring torque. To minimize weight of the carrier, the hub 4 has a large radius and the transition from the hub 4 to the arms 6 is smooth. Further, the wall thickness of the hub 4 and the thickness of the carrier arms 6 are minimized.

Figure 2:
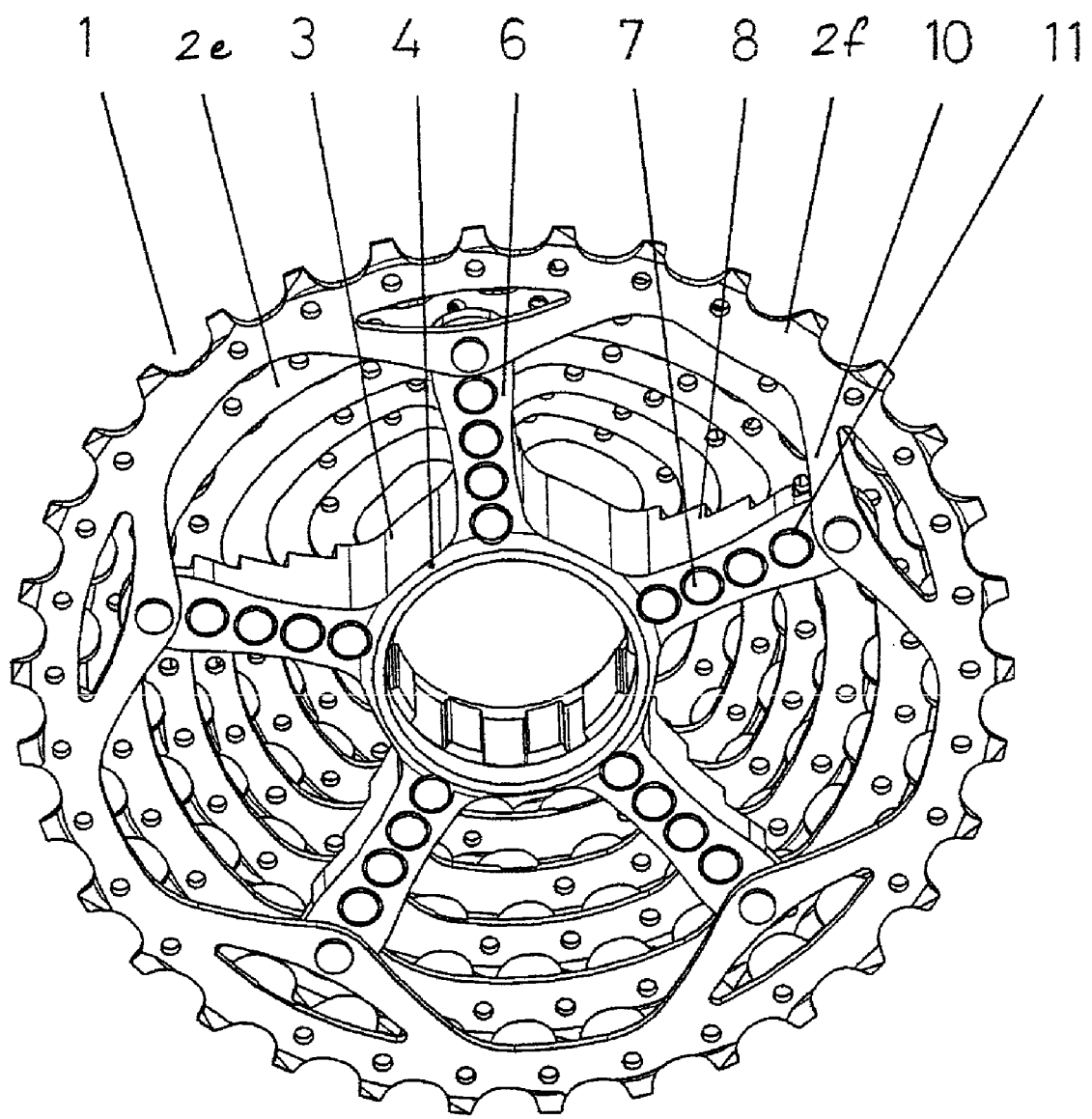
FIG. 2 is a perspective rear view of the sprocket assembly of FIG. 1.

Looking to FIG. 2, the carrier arms 6 include steps 8 disposed on a front face of the sprocket carrier 3 for receiving the sprockets 2b-2e. The carrier arms 6 are substantially flat on a rear face of the arms 6. To minimize weight, the carrier arms 6 narrows in circumferential width in a central region, which does not reduce the strength or stability of the carrier arm 6 because the axial thickness of carrier arms 6 is increased towards the hub 4 by the steps 8 on the front face of the carrier 6. The axial thickness of an end region of the carrier arm 6 is determined by spacings between the outer sprockets. The carrier arms 6 also include rivet holes 24, in this embodiment five rivet holes on each carrier arm 6, for receiving the rivets 7. The rivets 7 includes a rivet shaft 17 and a first rivet head 16. The rivet shaft 17 of the rivets 7 are inserted into the rivet holes 24 from the rear face of the carrier arm 6 and riveted on the front face of the sprocket 2 to form a second rivet head 18. The largest sprocket 2f and the second largest sprocket 2e are attached to each carrier arm 6 with one rivet 7. The largest sprocket 2f is attached to the rear face of the carrier arm 6 and the second largest sprocket 2e is attached to the front face of the carrier arm 6.

Figure 3:
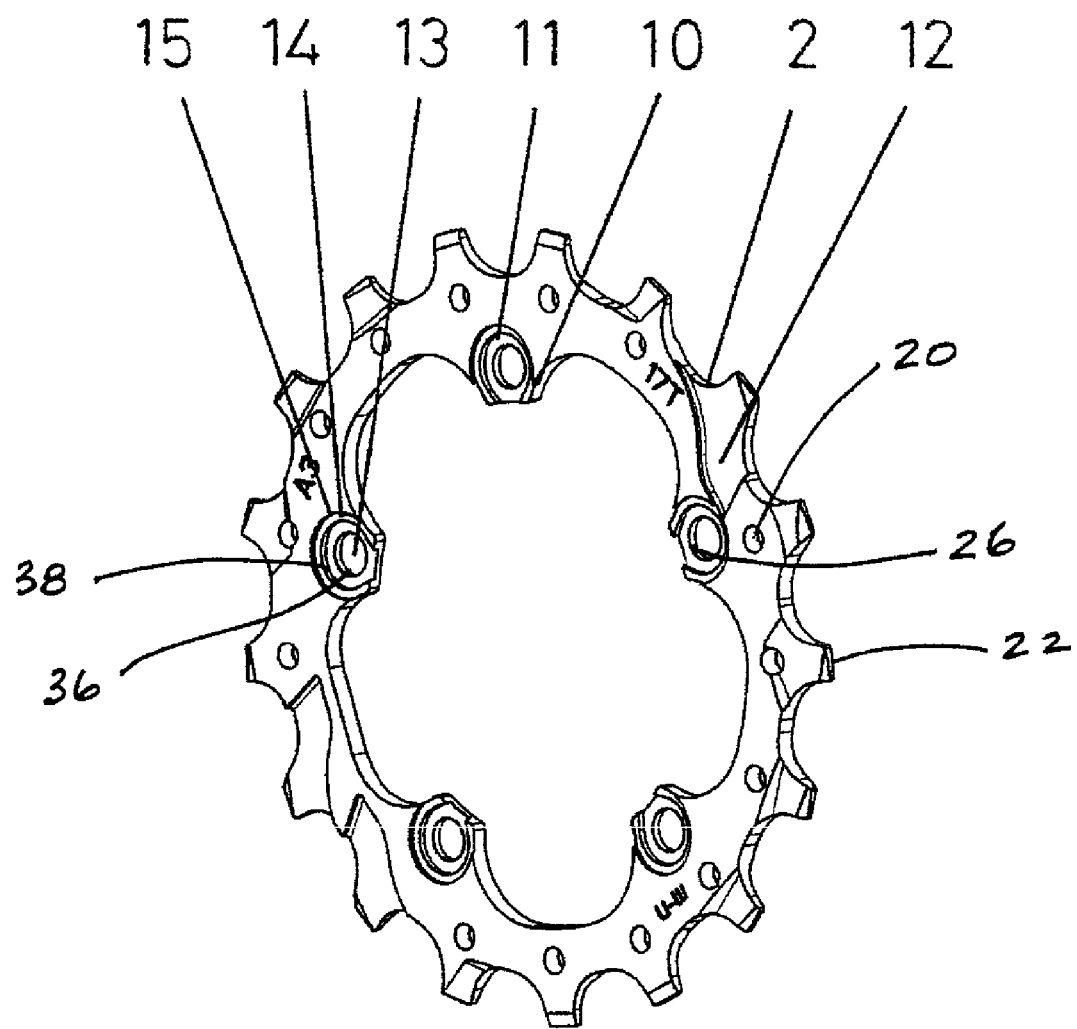
FIG. 3 is a perspective front view of a sprocket of the sprocket assembly of FIG. 1.

Looking to FIG. 3, the sprockets 2a-2f include a plurality of mounting brackets 10, in this embodiment five mounting brackets, extending radially inward. To minimize weight, the sprockets 2a-2f include holes 20 located below each tooth 22, except for teeth including a lateral cutout 12 for improving shifting of the chain between sprockets 2a-2f. Also to minimize weight, the amount of sprocket material that extends radially inward toward the hub is minimized. Rivet holes 13 are disposed on the mounting brackets 10. The rivet holes 13 include a shaft portion 26 for receiving the shaft 17 of the rivet 7, a countersink portion 11 for receiving the second rivet head 18 and a clearance portion 14 for receiving a riveting tool (not shown). The shaft portion 26 of the hole 13 has a first diameter 36 equal to or greater than the diameter of the unexpanded shaft 17 of the rivet 7. The countersink portion 11 of the hole 13 has a second diameter 38 equal to or greater than the diameter of the second rivet head 18. The clearance portion 14 of the hole 13 has a third diameter 15 configured to provide clearance for the riveting tool and has a larger diameter than an end of the riveting tool. The second diameter 38 is larger than the first diameter 36. The third diameter 15 is larger than the second diameter 38. Alternatively, the second diameter of the countersink portion may be as large as the third diameter of the clearance portion, however, this may impair the strength of the sprocket, which already has a very open construction in the region of the second rivet head.

Figure 4:
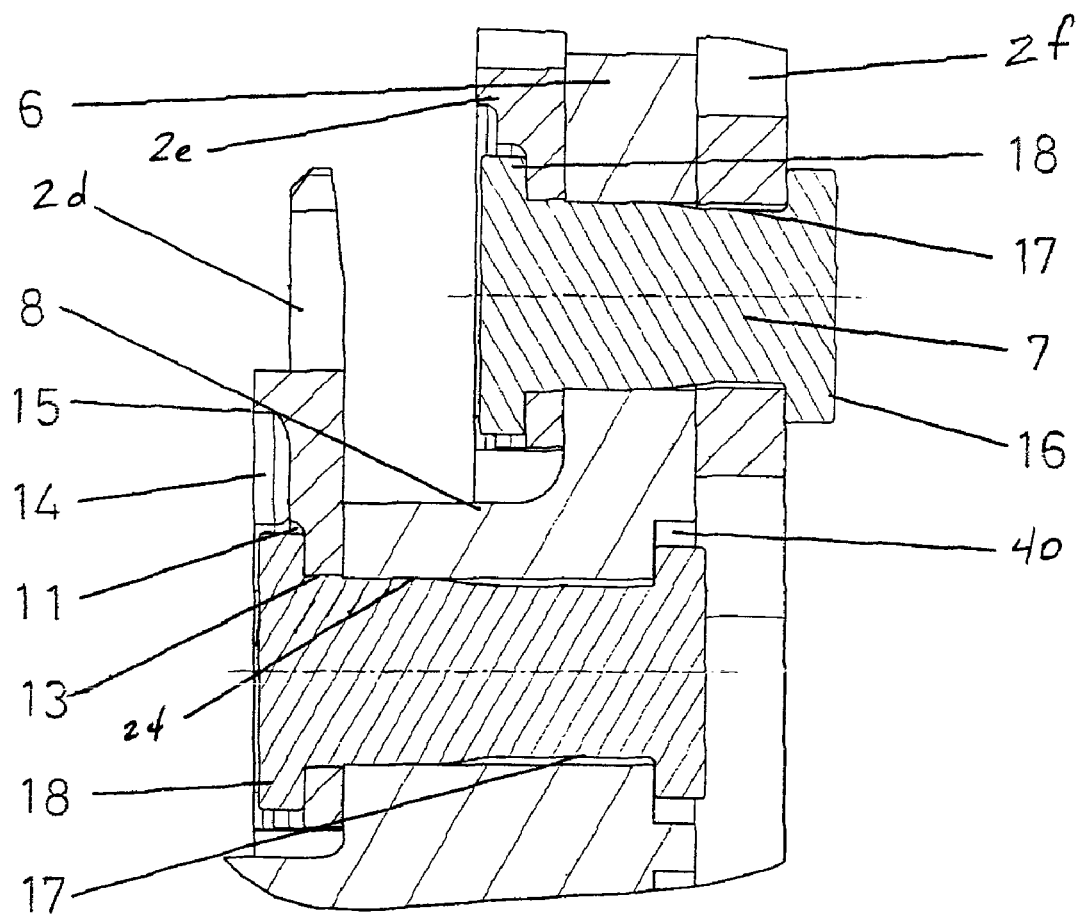
FIG. 4 is a partial cross-sectional view of the sprocket assembly of FIG. 1 showing in particular rivets mounting sprockets to a sprocket carrier.

FIG. 4 shows the three largest sprockets 2d-2f riveted to one of the carrier arms 6. A single rivet 7 is used to attach the largest sprocket 2f onto the rear face of the carrier arm 6 and to attach the second largest sprocket 2e onto the front face of the carrier arm 6. The third largest sprocket 2e and the other sprockets 2b-2d are riveted individually to end faces of the steps 8 of the carrier arms 6. Sprocket 2a is riveted to the front face of the carrier arm 6. To mount the sprocket 2 to the carrier arm 6, the rivet shaft 17 of the rivet 7 is inserted into the rivet hole 24 from the rear face of the carrier arm 6. The first rivet head 16 is partially countersunk into a countersink portion 40 of the rivet hole 24 on the rear face of the carrier arm 6, resulting in only a small portion of the rivet head 16 extending beyond the substantially flat surface of the rear face of the carrier arm 6. The second rivet head 18 is formed, by a riveting tool, on an end of the rivet shaft 17 extending through the front face of the carrier arm 6. During the riveting operation, the rivet shaft 17 expands and presses against the rivet hole 13 in the sprocket 2 and against a portion of the rivet hole 24 in the carrier arm 6. This creates a positive connection not only between the rivet 7 and the sprocket 2, but also between the rivet 7 and the carrier arm 6 of the sprocket carrier 3. The result is an immovable and aligned attachment of the sprocket 2 to the sprocket carrier 3. The second rivet head 18 is partially received in the countersink portion 11 of the rivet hole 13 and does not extend beyond the front face of the sprocket carrier 3. The clearance portion 14 of the rivet hole 13 prevents the riveting tool from striking the sprocket 2 directly during the riveting operation.

Figure 5:
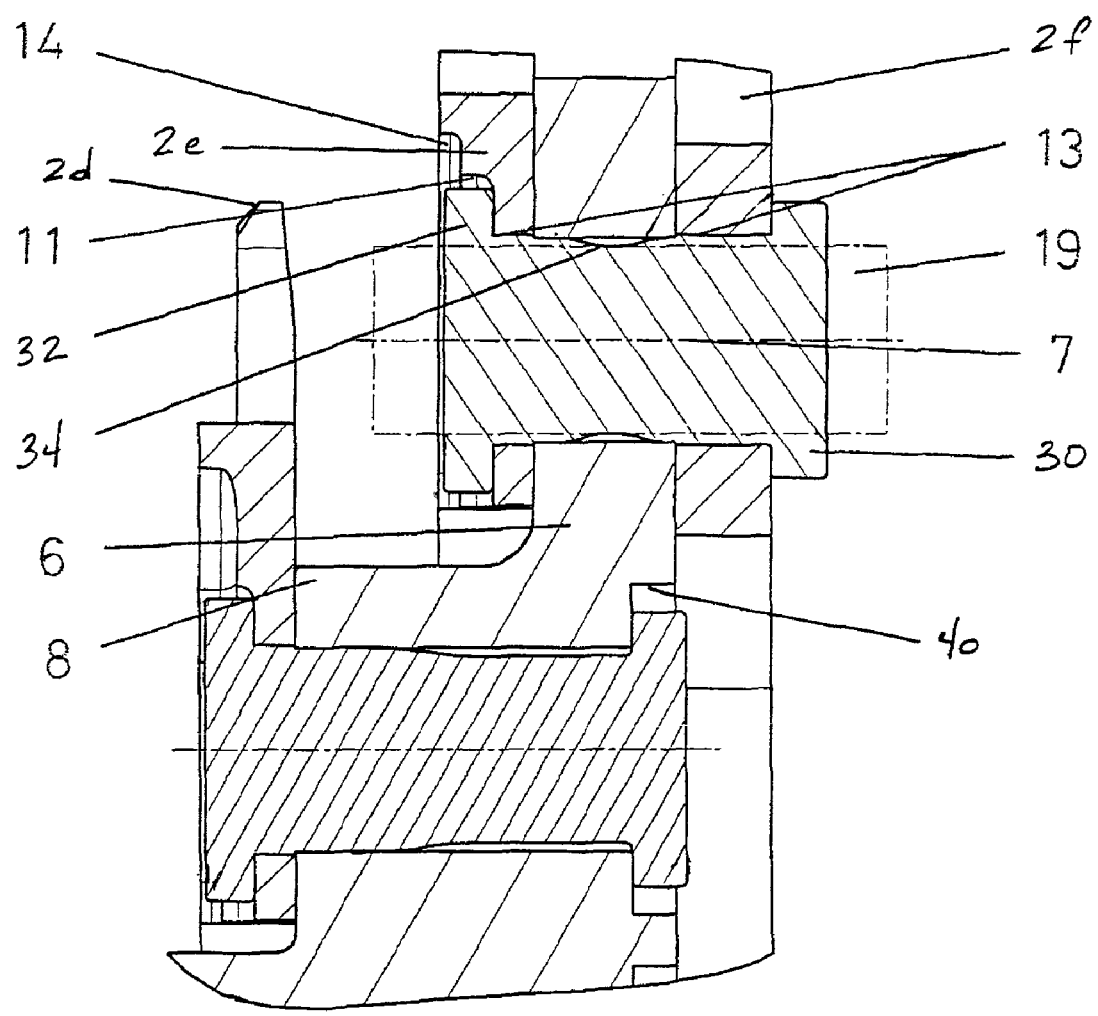
FIG. 5 is a partial cross-sectional view of a sprocket assembly in accordance with another embodiment of the present invention.

FIG. 5 depicts another embodiment of the present invention, similar to the embodiment of FIGS. 1-4, except that the rivets 7 have been replaced with pin rivets 19. A first rivet head 30 on the rear face of the sprocket carrier 3 and a second rivet head 32 on the front face of the sprocket carrier 3 are formed with the riveting tool. During the riveting operation, a rivet shaft 34 of the pin rivet 19 expands and presses against the rivet holes 13 in the sprocket 2 and against a portion of the rivet hole 24 of the carrier arm 6, creating a positive connection not only between the rivet 19 and the sprockets 2e and 2f, but also between rivet 19 and the carrier arm 6. The result is an immovable and aligned attachment of the second largest sprocket 2e and the largest sprocket 2f to the sprocket carrier 3. The second rivet head 32 is partially received in the countersink portion 11 of the sprocket 2 and does not extend beyond the front face of the sprocket 2. The clearance 14 prevents the riveting tool from striking the sprocket 2 directly during the riveting operation.

As shown in these figures, damage to the sprocket by the riveting tool is prevented by means of the clearance around the rivet head; and the weight of the sprocket assembly is minimized by way of an open construction of the sprockets, a thin hub wall thickness, and narrowing of the carrier arms.

While this invention has been described by reference to several embodiments, it will be understood that numerous changes could be made within the spirit and scope of the inventive concepts described. Accordingly, it is intended that the invention not be limited to the disclosed embodiments, but that it include the full scope permitted by the language of the following claims.

What is claimed is:

1. A riveted sprocket assembly for a bicycle comprising:
   a sprocket carrier having a plurality of carrier arms and a plurality of rivet holes therein;
   a plurality of sprockets, the sprocket carrier discrete from each of the sprockets; and a plurality of rivets for attaching the sprockets to the sprocket carrier arms, the carrier arms having front faces and rear faces disposed opposite the front faces, the front faces abutting the sprockets and having radially arranged steps of decreasing axial thickness in the radially outward direction, the rear faces having substantially flat profiles and being substantially coplanar with each other, the carrier arms having a narrower circumferential width at a rivet hole in a central region than a circumferential width at a rivet hole at an end region, the central region disposed radially inwardly of the end region of the carrier arms and wherein the width of each carrier arm tapers from the end region to the central region, wherein the width of the carrier arms that tapers forms a majority of the length of each of the carrier arms.

2. The riveted sprocket assembly of claim 1 wherein rivet heads of the rivets attaching the nonlargest sprocket are countersunk into the carrier arm to be substantially flush with the rear face of the carrier arm.

* * * * *